C. C. Hare.
Current Changing App's.
No. 91,126.   Patented Jun. 8, 1869.
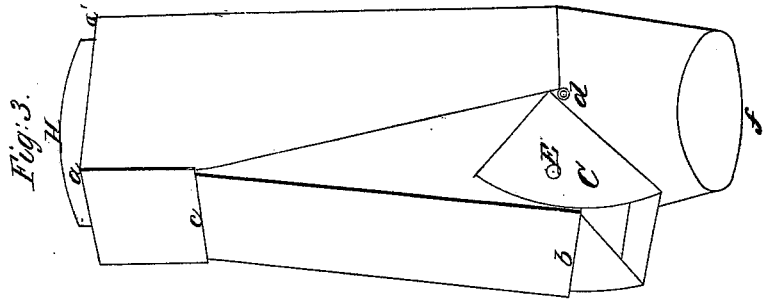
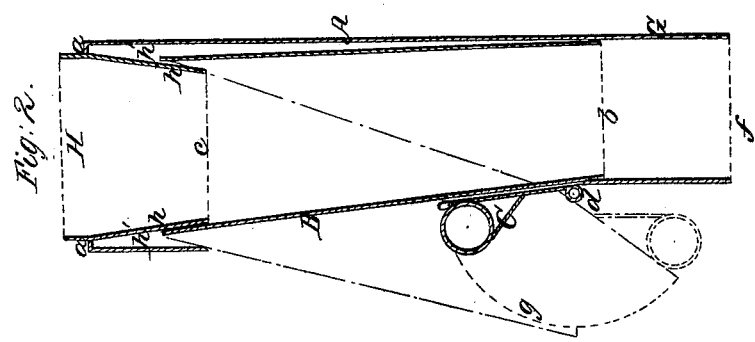
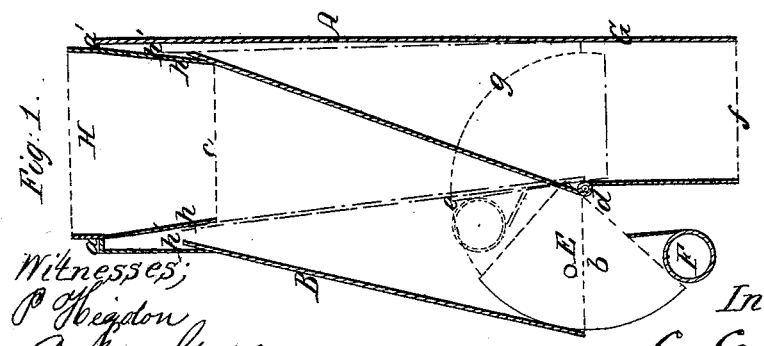
Witnesses:
P. Heydon
A. W. Stout
Inventor:
C. C. Hare

United States Patent Office.

C. C. HARE, OF KANSAS CITY, MISSOURI.

*Letters Patent No. 91,126, dated June 8, 1869.*

IMPROVEMENT IN CURRENT-CHANGING APPARATUS.

The Schedule referred to in these Letters Patent and making part of the same.

Be it known that I, C. C. HARE, of Kansas City, in the county of Jackson, and State of Missouri, have invented an Improved Current-Changing Apparatus; and I do hereby declare the following to be a full and exact description thereof, reference being had to the accompanying drawings, and to the letters of reference marked thereon.

The nature of my invention consists in the construction of an adjustable conducting-pipe, or channel, by which, when placed in a pipe leading water from the roof of a house, or other structure, the water, by a simple movement, may be led into either one of two receptacles, and excluded from the other, and *vice versa;* or when used in a mill of any kind, small grain, flour, meal, cement, lime, or other like powdered substance, may be conducted or diverted in its discharge in a similar manner; the device being so cheap and so simple that almost any one having a cistern to receive water from a dwelling or other house would be justified in procuring one for the mere purpose of diverting the water first falling in the form of rain from the roof, until the same shall have been washed clean of dust, soot, and other objectionable matters.

To enable others skilled in the art to make and use my invention, I will proceed to describe the same.

In the drawings—

Figure 1 represents a vertical section of my device, when in a position to divert the discharge from the main pipe, and Figure 2, a like sectional view of the device in a position to discharge through the main pipe.

Figure 3 represents a perspective view of the device in a position to divert the discharge from the main pipe.

It will appear from the drawing that the outside case, or pipe A, is constructed in a square form at the top, and continues in that form down to the hinge $d$, and from thence it may be gradually rounded, so as to assume the circular form just before reaching the bottom, the left side, however, from $c$ down to the hinge $d$, being left open, for reasons that will hereinafter appear.

In the upper end of the case A is inserted and fastened, water-tight, a tube, H, the top of which is circular in form, and extends high enough above the top of the case to form a good joint with a water or other conducting-pipe.

From the top of the case downward the tube H is made gradually to assume the square form, and is also gradually contracted, so as to become considerably smaller than the outer case at its lower edge, $c$.

The lower end of the case A may be reduced to the circular form, in order to connect by joint with another pipe of similar form.

The form of the sliding pipe B is plainly shown in the drawings. It is square in form, and so much smaller than the outer case A as to allow of its action hereinafter described, and its upper end plays up and down freely between the outer case and the tube H;

and when the device is in the position for the straight downward discharge, the sliding pipe occupies the position represented in fig. 2, but when it is position to divert the discharge therefrom, it occupies the position shown in fig. 1. Its top in either position never falls below the bottom of the tube H, and when in position to divert the discharge from the main pipe, it occupies the position shown in fig. 1, its bottom about on a level with hinge $d$, but when for discharge through the main pipe, its lower end $b$ is a little below that hinge, as shown in fig. 2.

The efficiency of this device results from the quickness and facility with which it is adjusted, so as to discharge either through its lower end $b$ or the lower end $f$ of the main pipe.

This is done mainly through the instrumentality of the lip C, which is shown as closed in fig. 2, and open in figs. 1 and 3.

Near the lower edge of it, it is attached to the main pipe by a hinge-joint, $d$, and when it is pulled back or operated by the handle F, its top describes the arc of a circle, as shown by the red line $g$, fig. 2, and when it is closed, the lower edge falls a little below the hinge $d$.

It is obvious that this lip may be moved within and without the walls of the main pipe with great facility.

The lower end of the sliding pipe is loosely pivoted between the wings of the lip C and the pivot-bolts, so located in the wings, and in the sides of the pipe, that the lower end of that pipe will turn on the pivot-bolts as its bearings, and may be pushed into the main pipe, or drawn out of it, by the closing and opening of the lip, as before explained.

It is obvious, from the construction and arrangement of the lip C, that when it is open, its own weight will hold it open, and when closed will hold it closed; and the force of a current of any material discharged through either the main or sliding pipe, tends to hold all the parts in proper position; and that all the joints in the device are so made that not even fluids can escape, after entering the tube H, except in the manner designed.

This device may be made in the round as well as in the square form, and of any kind of sheet or cast-metal or wood.

What I claim as new, and desire to secure by Letters Patent, is—

1. The sliding pipe B, in combination with the outer pipe A and the tube H, constructed substantially as and for the purpose described.

2. The hinged and pivoted lip C, in combination with the sliding pipe B, case A, and tube H, constructed and arranged substantially as and for the purpose described.

C. C. HARE.

Witnesses:
A. M. STOUT,
CHAS. H. FLETCHER.